Jan. 9, 1968   J. S. EVANS, JR   3,363,256
OSCILLOGRAPH WITH PIVOTABLE FILM DRIVE ASSEMBLY
Filed May 4, 1966   4 Sheets-Sheet 1
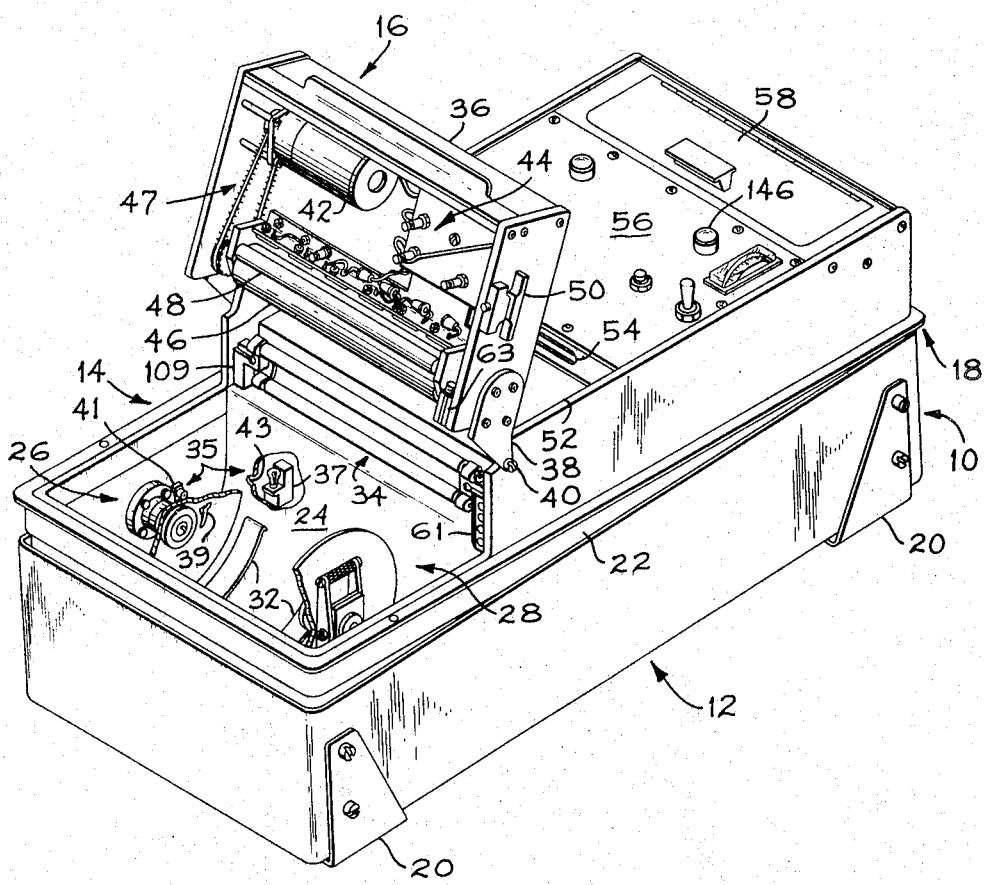
FIG_1
INVENTOR.
JOHN S. EVANS, JR
BY Robert H. Clay
ATTORNEY Jan. 9, 1968  J. S. EVANS, JR  3,363,256
OSCILLOGRAPH WITH PIVOTABLE FILM DRIVE ASSEMBLY
Filed May 4, 1966
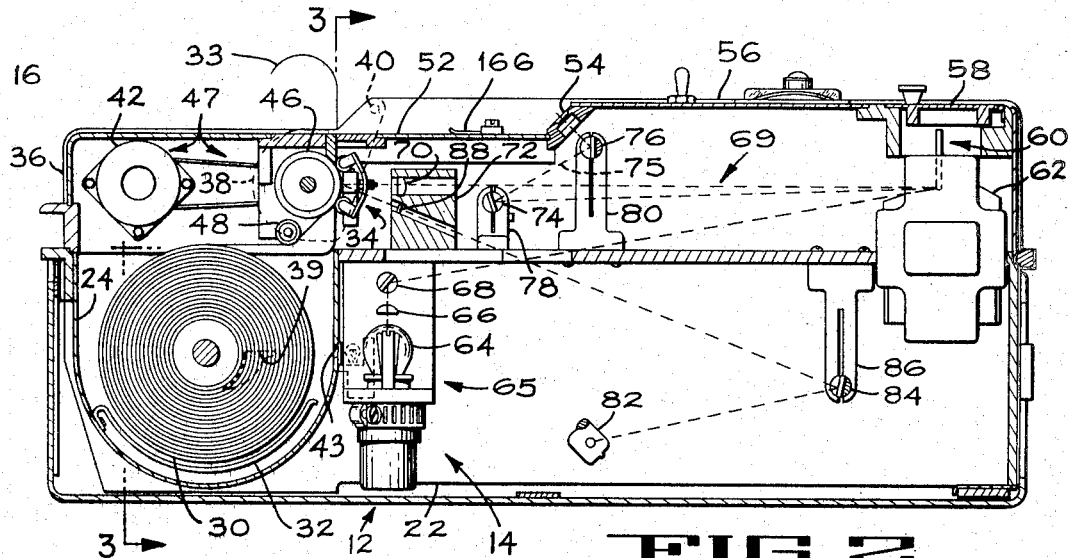
FIG_2
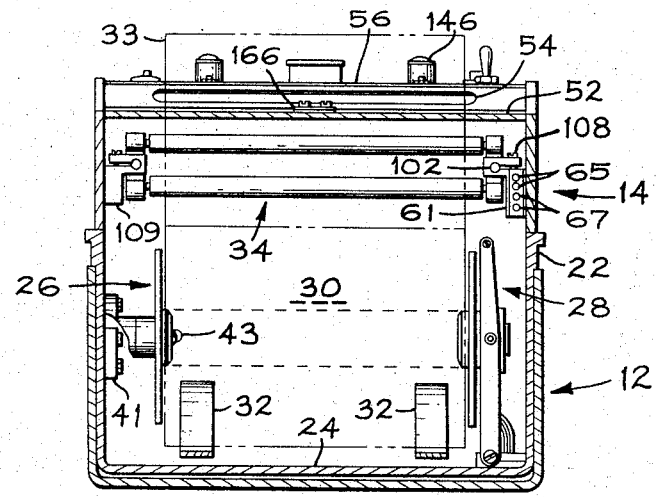
FIG_3
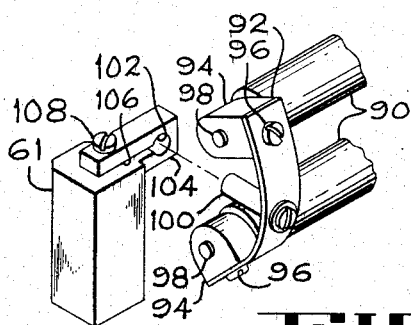
FIG_4
INVENTOR.
JOHN S. EVANS, JR
BY Robert H. Clay
ATTORNEY Jan. 9, 1968  J. S. EVANS, JR  3,363,256
OSCILLOGRAPH WITH PIVOTABLE FILM DRIVE ASSEMBLY
Filed May 4, 1966  4 Sheets-Sheet 3
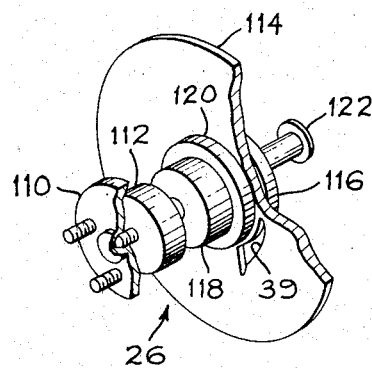
FIG_5
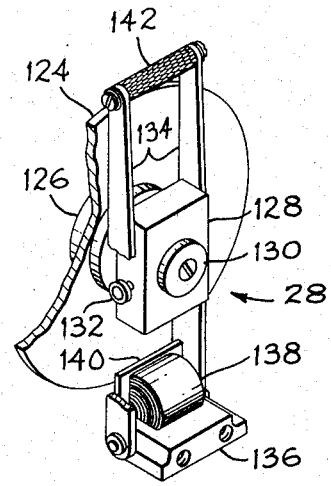
FIG_6
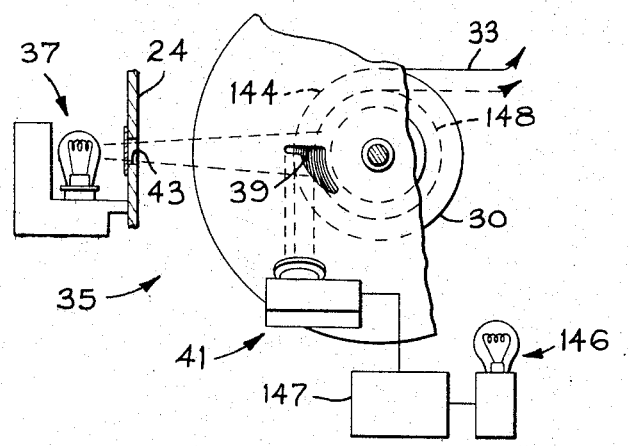
FIG_7
INVENTOR.
JOHN S. EVANS, JR
BY Robert G. Clay
ATTORNEY

3,363,256
OSCILLOGRAPH WITH PIVOTABLE FILM DRIVE ASSEMBLY

John S. Evans, Jr., Houston, Tex., assignor, by mesne assignments, to Mandrel Industries, Inc., Houston, Tex., a corporation of Michigan
Filed May 4, 1966, Ser. No. 547,654
10 Claims. (Cl. 346—17)

The present invention relates to oscillograph cameras for converting electrical signals to visible records, and more particularly to an improved oscillograph for seismic information recording redesigned to accommodate "dry" as well as "wet" process film paper, the design including a preferred paper threading and drive system therefor, wherein all parts in the oscillograph are readily accessible for replacement or maintainance thereof.

Before the advent of "dry" process photosensitive paper such as for example, Kodak No. 480, oscillographs used in the seismic exploration field utilized "wet" process photosensitive paper and accordingly were particularly designed to accommodate such paper. Since dry process paper has become available prior art oscillographs have simply been modified to adapt the conventional configurations thereof to the new paper. Similar modifications have been made to the oscillographs to adapt the circuits from tube to transistor operation resulting in further modifications in the mechanical configurations thereof. In the course of these cascading modifications prior art oscillograph design has become a patchwork of modifications resulting in cumbersome equipment having unwieldy paper guides, paper drive systems, optics and electronics.

The present invention overcomes the shortcomings of the prior art devices by providing a completely redesigned oscillograph equally adaptable to both wet process film paper and particularly the more desirable dry process film paper, wherein the design is centered around the advantages made possible by the new dry paper and by solid state electronic circuitry.

It is thus an object of the present invention to provide a redesigned dry/wet process recording oscillograph for converting electrical signals to visible records.

It is another object of the invention to provide an ocillograph having an improved, relatively simple paper drive and guide system with positive paper feed, wherein paper loading is done from the top of the oscillograph with no threading required.

It is yet another object of the present invention to provide an oscillograph wherein the entire paper drive system is mounted within a swing-out housing for ready access, or immediate replacement of the entire unit within a few seconds, to facilitate maintainance as well as use thereof.

It is still another object of the invention to provide an oscillograph having an electrical low paper indicator device which utilizes no mechanical levers or sliders and which provides in addition, an indication of the amount of paper remaining for a period of time prior to running completely out of paper.

It is still another object of the invention to provide an oscillograph which utilizes a 12 volt hysteresis synchronous motor and a sprocket-belt system having zero backlash and vibration-free silent operation.

Additional objects and advantages will be apparent from the specification taken in conjunction with the figures of which;

FIGURE 1 is a simplified perspective view of an oscillograph of the invention with the pivoted paper feed assembly partially open showing the paper magazine.

FIGURE 2 is a cross-section view of the oscillograph of FIGURE 1.

FIGURE 3 is a cross-section view taken generally along line 3—3 of FIGURE 2.

FIGURE 4 is a partial, perspective view of one end of the rocker pressure roller assembly and the mounting system therefor.

FIGURES 5 and 6 are perspective, partially broken-out views of the fixed paper holder assembly and the spring-loaded paper holder assembly respectively.

FIGURE 7 is a schematic view of the low paper indicator device.

Figure 8:
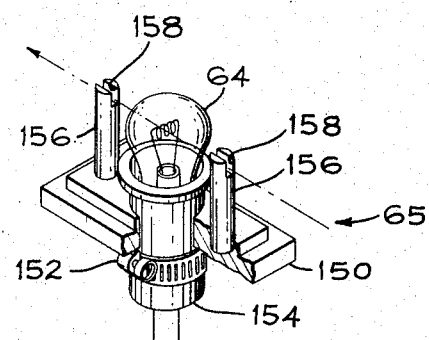
FIGURE 8 is a perspective view of the adjustable galvanometer lamp holder means of the invention.

Referring now to FIGURE 1 there is shown the improved oscillograph 10 of the invention comprising three major members; an outer case 12, a camera assembly 14, and a pivoted film paper feed assembly 16. The oscillograph 10 is designed to provide ready access to all parts within the camera assembly 14, by means of a pivot point 18 at the top rear of the case 12, whereby as indicated the camera assembly 14 may be swung out of the case and locked in position to expose the bottom and sides thereof. In addition, the paper feed assembly 16 is provided with a pivot whereby it may be swung upwardly and back to lie flat on the top of the camera assembly 14 to provide access thereto, as well as to allow threading the film paper in a manner hereinafter further described. Mounting brackets 20 are provided on the case 12 whereby the camera can be securely mounted to a surface with either a vertical or horizontal orientation.

Substantially two thirds of the camera assembly 14 is utilized for housing the optical system and the electronic circuitry of the oscillograph which is for the most part conventional in design and is not therefore described in detail herein. Substantially the front one third of the camera assembly 14 is cut away at the top thereof to receive the pivoted paper feed assembly 16 and to provide thus a paper support and feed system for the oscillograph 10.

The camera assembly 14 comprises essentially a substantially rectangular housing 22 which fits easily within the case 12 and is rigidly secured therein in pivotal relation at pivot point 18. The housing 22 includes a paper magazine 24 formed in the front portion thereof and having preferably a semi-cylindrical bottom portion. A fixed paper roll holder assembly 26 is secured to one side wall of the paper magazine 24 and a spring-loaded paper roll holder assembly 28 is pivotally secured at the other end of the paper magazine 24. The assemblies are disposed in axial alignment for receiving a roll 30 of dry or wet process film paper such as commonly used in the art, and as shown in FIGURE 2. A pair of roll-loading springs 32 are secured at one end thereof to the semi-cylindrical bottom of the paper magazine 24, and have an arcuate configuration generally matching that of the bottom and of the roll 30. The springs 32 act to prevent the roll 30 from falling to the bottom of the magazine 24 during the loading process and thus aid in aligning the roll 30 with the roll holder assemblies 26, 28. In register with the front of the cut-out portion of the housing 22 there is disposed a rocker pressure roller assembly 34 which provides means for properly feeding the paper, indicated by numeral 33, from the paper roll 30.

A low paper indicator device, depicted generally by numeral 35 comprises the combination of a color filtered light source means 31, a low paper indicator hole 39 and a light receiving device or low paper indicator photocell 41. The color filtered light source means 31 includes a light source 37 mounted within the housing 22 behind the rear wall of the paper magazine 24, which in combination with a color filtered aperture 43 in the wall, provides a beam of color filtered light which is directed towards the axis of the paper roll 30 immediately adjacent the fixed roll holder assembly 26. Color filtering is provided by disposing a filter glass, such as for example, Corning glass No. 2424 ground to color specification 2–63, in the aperture 43. The photocell 41 is secured to the wall behind the assembly 26 in register with the hole 39 at such time during rotation of the roll and assembly 26 as the hole is in line with the beam of light from the source 37 and the photocell 41.

The pivoted paper feed assembly 16 has as a housing or lid 36, formed of the cut-out portion of the rectangular housing 22, which is pivotally secured to the housing 22 by means of pivot brackets 38 and pivot bolts 40. The lid 36 houses a paper drive motor 42, a drive circuit 44 for energizing and controlling the paper drive motor 42, a paper drive roller 46 positively coupled to the motor via a replaceable sprocket and drive belt assembly 47 and rotatably supported within the lid 36, and a guide roller 48 rotatably mounted within the lid 16 immediately adjacent and parallel to the drive roller 46. A paper feed assembly latch 50 is provided at either side of the lid 36 and is adapted to lock the lid to the housing 22.

The housing 22 is provided with an access plate 52 slidably disposed immediately behind the lid 16 and level with the top thereof when the latter is closed. When the lid 36 is raised the access plate 52 may be withdrawn from slots provided in the housing 22 to allow ready access to the rocker pressure roller assembly 34 and part of the optical system of the oscillograph. A color filtered monitor screen 54, utilizing a filter glass such as the Corning glass No. 2424 of previous mention, is integrally disposed within the top side of the housing 22 immediately to the rear of the access plate 52, and overlooking same, and provides means for monitoring the galvanometer traces of the oscillograph 10 whereby the traces can be positioned and focused as required. An oscillograph control panel 56 is disposed along the rearmost top portion of the housing 22, and provides support for the various indicator lights and switches utilized in the operation of the oscillograph. A galvanometer access door 58 hinged along the rear edge thereof provides access to a plurality of glavanometers 60 for maintenance, adjustment, and replacement thereof. As depicted schematically in FIGURE 2, the galvanometers 60, numbering up to 32, are disposed in a shock mounted galvanometer block 62 in a manner generally known in the art.

In order to introduce a supply of electricity to the paper feed assembly 16 without the use of conductors with sufficient slack to allow pivoting the lid 36 back against the housing 22, electrical contact blocks 61 and 63 are secured to the housing 22 and to the lid 36 respectively. Four electrical contacts are provided, wherein the upper pair of contacts 65 deliver the 12 volt direct current power for energizing the motor 42, and the lower pair of contacts 67 deliver a 400 cycle synchronizing signal for control of the motor 42. The contacts on the block 61 are of the rigid button type, while those on the block 63 are of a folded spring type (not shown) having an additional coil spring disposed behind each to provide firm and positive electrical contact therebetween at such time as the lid 36 is closed. Note that as the lid 36 is opened from a closed position the lower pair of contacts 67 break first due to the longer radius of rotation from pivot bolt 40, thereby disrupting the 400 cycle circuit first and essentially turning off the power to assembly 16. Immediately thereafter the 12 volt power circuit, which carries about 2 amperes, is disrupted. Thus, the higher amperes 12 volt circuit is not disrupted when carrying the full load which would tend to damage the respective contacts.

Referring now to FIGURE 2, light sources and associated optical components forming the glavanometer and timing line light paths in the oscillograph are depicted schematically. By way of example only, a light source 64, of a type such as a General Electric No. 1613 automotive lamp, is adjustably secured by an adjustable galvanometer lamp holder means 65 within the housing 22 substantially centrally therein as further described hereinafter. Light emitted therefrom is collected and directed, via a lamp condenser lens 66, against a mirror assembly 68. The light is reflected from mirror assembly 68 in the form of a flat sheet of light which impinges the aligned mirrors (not shown) of the row of galvanometers 60. Each galvanometer 60 forms a small, vertically extending light trace 69 which it directs towards the front of the oscillograph 10 and into a galvanometer condenser lents 70 mounted within a block 72. The lens 70 accepts the plurality of small vertically extending, light traces 69 and focuses them on the surface of the drive roller 46 and thus on the surface of the film paper 33. A monitor mirror assembly 74 is secured by a bracket 78 immediately beneath the plurality of vertical light traces 69 and is positioned to intercept a small portion of the lower side of each trace to form a like plurality of monitor traces 75 representative of the galvanometer light traces 69, which it then deflects upwardly against a second monitor mirror assembly 76 supported by bracket 80. The plurality of monitor traces 75 are then deflected by assembly 76 into the color filtered monitor screen 54 to provide the operator of the oscillograph a plurality of traces 75 which represent the galvanometer traces 69, whereby positioning and focusing thereof is accomplished. The galvanometers 60 are each energized by the respective electrical signals which are to be recorded and which are introduced to the oscillograph via an external connector block (not shown) mounted on the back of the housing 22, wherein the degree of deflection of the galvanometer traces 69 are representative of the signal magnitudes. Such operation is well known in the art and therefore is not further described herein.

The timing line optical system comprises a Zenon flash lamp 82 mounted within the housing 22, and which provides extremely intense light beam which is directed therefrom to a timing line mirror assembly 84 secured within the housing 22 by means of a bracket 86. The light is reflected from the timing line mirror assembly 84 in the form of a sheet of light and is directed therefrom to pass through a timing line condenser lens 88 disposed within the block 72. The timing line condenser lens 88 focuses the sheet of light into a line lying coincident with the points at which the galvanometer traces 69 are focused upon the film paper 33.

Referring now to FIGURE 4 there is shown in greater detail the rocker pressure roller assembly 34 and the means for mounting the assembly within the housing 22. The assembly 34 employs two rollers 90 secured in spaced-apart parallel relation, at either end thereof, to flexible spring strips 92 by means of a pair of roller blocks 94 and respective screws 96. The blocks 94 in turn retain roller shafts 98, thereby rotatably securing the pressure rollers 90 in a flexible, variably-spaced relation. A roller mounting post 100 is perpendicularly secured to the center of the spring strip 92 to extend therefrom outwardly between the blocks 94. The roller assembly 34 is secured at one end within the oscillograph by means of the mounting post 100 which fits snugly within an aperture 102 formed in a protruding portion of the electrical contact block 61. The protruding portion 104 is slotted as at 106 and is provided with a bolt 108 which can be tightened after inserting the mounting post 100 within the aperture 102, thus securing the respective end of the roller assembly 34 tightly in a select position. A similar mounting block 109 is provided at the opposite end of the roller assembly 34 for adjustably securing same in like manner. It may be seen that the pressure applied by the spring strip 92 and thus the spacing and pressure supplied by the rollers 90 against the drive roller 46, may be varied by varying the depth to which the mounting post 100 is inserted into the aperture 102. Each mounting block 61 and 109 may be separately adjusted to thus control the paper feeding or guiding characteristics of the pressure roller assembly 34.

Referring now to FIGURE 5 there is shown in greater detail the fixed paper roll holder assembly 26 utilizing a mounting base 110 having holes therein for demountably securing the base to the wall of the paper magazine 24. Integrally affixed thereto is a first brake disc 112. A roll holder flange 114 is provided at its inside surface with a concentric paper roll insert 116 having a diameter equal to that of the inside diameter of the paper roll 30. Concentrically mounted on the other surface of the flange 114 is a second brake disc 118 which is integrally secured thereto by means of a mounting plate 120. The low paper indicator hole of previous mention is formed as shown in the roll holder flange 114 immediately adjacent the circumference of the insert 116. The brake discs 112, 118 are formed of a material such as for example a linen base, phenolic material, which, when pressed together, provide a certain degree of friction which would not be achieved for example by metal plates. When a roll is inserted in the paper magazine 24 a small amount of pressure is exerted against the flange 114 by action of the spring-loaded roll holder assembly 28. Thus, the disc 118 is pressed slightly against the disc 112 to provide a degree of friction therebetween and a corresponding braking action for the paper roll 30 to prevent random unrolling of the film paper. The combination of parts forming the roll holder assembly 26 is held snugly in place along a common axis by means of an axially extending threaded shaft 122 which screws into the base 110.

Referring to FIGURE 6 the spring-loaded paper roll holder assembly 28 is shown in greater detail and comprises a roll holder flange 124 having a roll holder insert 126 concentrically fixed thereto in axial register with the roll holder insert 116 of flange 114. The flange 124 may be secured to a block 128 by means of a threaded shaft 130. The block 128 is secured in a horizontally pivotable manner via pins 132 to a pair of arms 134. The arms 134 are pivotally attached at the bottom ends thereof to a mounting block 136 which is secured within the paper magazine 24 opposite the fixed roll holder assembly 26. A plurality of leaf springs 138 are provided and bear against the mounting block 136 and a stop 140 which is in turn secured between the arms 134. The leaf springs 138 force the flange 124 against the roll 30 to confine same between the assemblies 26, 28, and to also provide the above-mentioned slight pressure to effect the braking action between the discs 112, 118. A knurled handle 142 is secured across the upper ends of arms 134 whereby the operator of the oscillograph may press the holder assembly 28 back against the wall of the paper magazine 24 to provide space for loading the paper roll 30 between the flanges 114, 124 and inserts 116, 126 respectively.

Referring now to FIGURE 7 there is shown in greater detail the low paper indicator means 35. The light source 37 is mounted against the wall of the paper magazine 24. The light therefrom passes through the color filtered aperture 43 in the magazine wall which aperture prevents harmful white light from accidentally exposing the film paper, and the filtered light shines against the outer circumference of the paper roll 30. As long as the roll 30 has more than a selected amount of paper, no light is exposed to the photocell 41 during rotation of the roll 30, since the indicator hole 39 is covered by the paper. At such time as the roll diminishes in size, as indicated at 144, a small portion of the hole 39 is exposed, allowing a small pulse of light to reflect from the surface of the paper roll 30 into the photocell 41. The photocell is thus momentarily activated each time the roll 30 rotates through one turn to thus activate a circuit 147 and cause an indicator lamp 146 connected thereto to blink. The indicator lamp 146 is mounted on the control panel 56 (FIGURES 1 and 2) and upon energization of the lamp 146 the oscillograph operator is warned that the paper roll 30 is approaching the end. Due to the increasing dimension of the indicator hole 39, as the paper roll 30 diminishes further in diameter as indicated by numeral 148, the time during which light activates the photocell, and thus lights the indicator lamp 146 increases in duration, and an experienced operator can accordingly substantially gauge how much paper remains on the roll 30 prior to completely running out. The photocell 41 may be biased by means of a 12 volt source, and associated circuitry herein generally indicated as circuit 147.

Referring now to FIGURE 8 there is shown in greater detail the adjustable galvanometer lamp holder means 65 of previous mention. The holder means comprises a base plate 150, which has integrally secured thereto an adjustable clamp 152. An elongated lamp socket 154 is slidably and rotatably disposed within an aperture in the plate 150 and within the clamp 152, whereby the lamp 64 may be rotated as well as vertically adjusted relative to the base plate 150. The clamp 152 may then be tightened when the lamp is in position to rigidly secure the socket 154 therein. Since the galvanometer lamp 64 is a conventional automative lamp the filament within the lamp may not be identically located in each lamp. Since any substantial deviation in the position of the filament with respect to the optical path, i.e., the lamp condenser lens 66, results in undesirably providing a varied amount of light to the optical path system, it is preferable that means be provided whereby the filament of each lamp when replaced is disposed in substantially the same location relative to the lamp condenser lens 65. Accordingly, bayonet posts 156 having slots 158 in the upper ends thereof, are perpendicularly secured to the base 150 along a diameter of the socket 154. By sighting through the slots 158 in the bayonet posts 156 the filament within the lamp 64 may be rotated as well as vertically adjusted to place it in not only a perpendicular position relative to the line of sight between the posts 156, but also level therewith. Thus, any lamp may be utilized, and the variations in the filament location within the lamp may be compensated for by means of the adjustable holder means 65, rather than having to sort out the lamps in order to retain only those wherein the filament is in substantially the same location therein.

Figure 9:
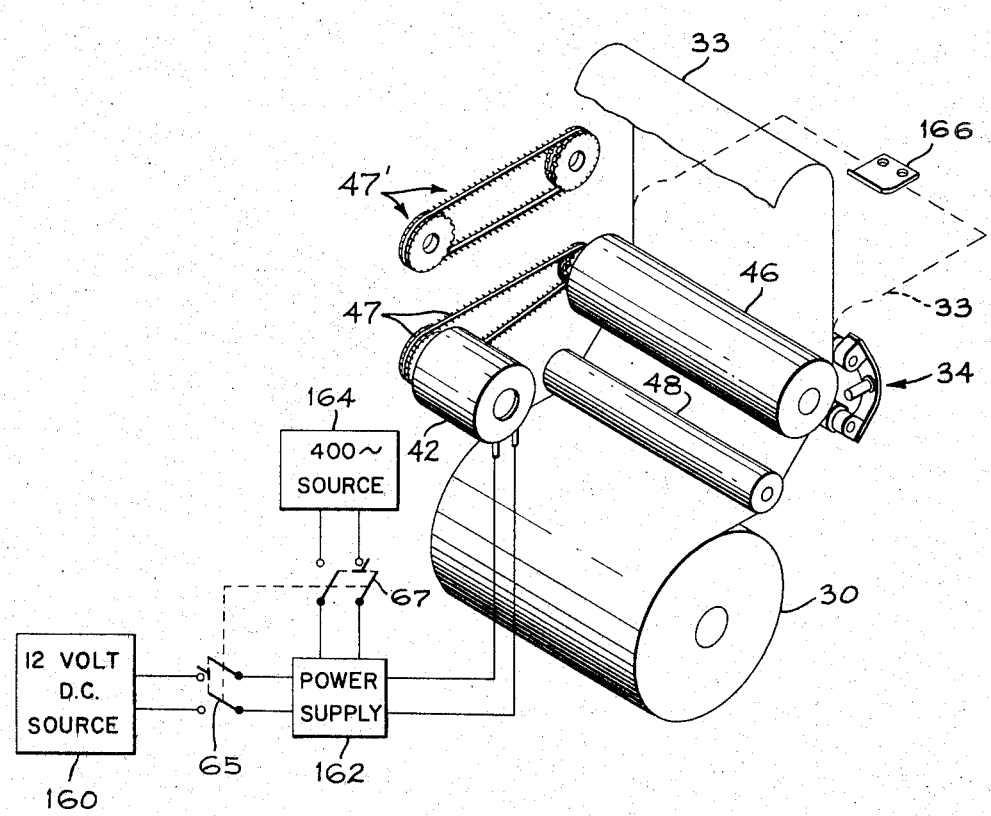
FIGURE 9 is a schematic representation depicting portions of the film paper guide and drive assemblies of the invention.

FIGURE 9 depicts the film paper feed and drive system of the invention. The paper 33 passes from the roll 30, under guide roller 48 and between drive roller 46 and the rocker pressure roller assembly 34, to exit from the oscillograph upon exposure to the galvanometer traces. The drive roller 46 is rotated by the motor 42, at for example any of three selected speeds of 6, 12 and 24 inches per second, via the sprocket and drive belt assembly 47. By interchanging the larger sprocket on the motor 42 with the smaller sprocket on the drive roller 46 the speed of the paper 33 is changed from 24 inches per second to 6 inches per second. To obtain a paper speed of 12 inches per second another sprocket-belt assembly 47' having sprockets of equal diameters is used in place of assembly 47. Change of speed is accomplished by simply sliding the sprockets off and on their respective shafts; there is no change in the center distance between the sprockets since the sprocket diameters are proportional. The motor 42 is driven by a 12 volt direct current source 160 via the electrical contacts 65 and a motor drive circuit or power supply 162. Control is provided by a 400 cycle source 164, via contacts 67 and the power supply 162.

The motor 42 is a single speed, 12,000 r.p.m. 12 volt 400 c.p.s. synchronous hysteresis motor wound for this purpose by Globe Industries, and because of its low voltage input allows the use herein of the simple drive circuit of FIGURE 9 without the need of the usual bulky power transformer and associated circuitry. Additionally, the use of a low voltage motor provides for a reduction in noise feedback into the associated equipment by a factor of 10, as well as increased safety for the operating personnel.

Note that the oscillograph 10 is loaded with a paper roll 30 without any need for threading the end of the paper 33. Loading is accomplished by pivoting the lid 36 back upon the top of the housing 22, which exposes a metal clip 166 (FIGURES 2, 3 9) secured to the top of access plate 52. Since both rollers 46 and 48 are secured to the lid 36 and are out of the way, the paper 33 is simply drawn up over the rocker pressure roller assembly 34 and the end is pushed under the clip 166, where it is held as shown in phantom line in FIGURE 9. Then the lid 36 is pivoted back to the closed position and locked by latches 50 whereupon, action of the rollers 46, 48 while the lid 36 is closing withdraws the end of the paper 33 from under the clip 166 and the oscillograph is loaded, ready for use.

Although the invention has been described herein with respect to a particular configuration, it is to be understood that various modifications could be made thereto within the spirit of the invention. The device is adapted for use with "wet" film paper for example, by securing a bracket (not shown) to the lid 36 and access plate 52, which in turn is adapted to receive in light-sealed relation a paper receiving cannister (not shown) of the conventional type which prevents exposure of the paper 33 to light after exposure thereof to the galvanometer traces 69 and prior to developing the paper. Thus it is not intended to limit the invention except as defined in the following claim.

What is claimed is:

1. An improved oscillograph for converting electrical signals into visual representations thereof which are recorded upon a photosensitive film paper, the improvements comprising;
   (a) housing means for supporting the oscillograph and including therein a plurality of optical light paths and light sources to form a plurality of galvanometer light traces and a timing light beam;
   (b) film paper support and guide means disposed within a frontmost portion of said housing means and adapted to rotatably support in removable relation a roll of said photosensitive film paper;
   (c) a pivotable film paper drive assembly disposed in combination adjacent the film paper support and guide means and adapted to receive and drive the film paper from the support and guide means, said drive assembly being pivotally secured to the housing means to expose the film paper support and guide means when swung to an open position, where upon withdrawing a length of the film paper from the support and guide means the drive assembly is adapted upon closure to place the film paper in position to be driven by the paper drive assembly;
   (d) said support and guide means further cooperating with said pivotable film paper drive assembly to guide and drive the film paper so as to expose a select portion thereof to the light beams formed by the optical light paths, wherein the light beams respond proportionally to the electrical signals to represent same upon the film paper.

2. The improved oscillograph of claim 1 wherein the light source for forming a plurality of galvanometer light beams in combination with the optical light paths further includes an adjustable light bulb holder comprising a base, a clamp integrally secured to said base, a light bulb socket slidably and rotatably disposed within said base and said clamp, and a pair of bayonet posts secured to said base and adapted to provide a reference line by which the light bulb may be oriented into a select position and thereafter secured by means of said clamp.

3. The improved oscillograph of claim 1 wherein said photosensitive film paper is provided in the form of a roll of paper, and said film paper support and guide means further comprises a pair of paper roll holder assemblies disposed at either side of the paper roll in rotatable relation within said housing means, and a pair of spaced-apart pressure rollers adjustably mounted within the housing means and adapted to receive thereagainst the film paper.

4. The improved oscillograph of claim 3 wherein said pivotable film paper drive assembly further comprises, a hinged lid member pivotally secured to said housing means, a drive roller rotatably secured within the hinged lid member in substantially parallel relation to the pair of pressure rollers and adapted to bear thereagainst upon closure of the lid member, motor drive means positively coupled to the drive roller to rotate same against the pair of pressure rollers, and electrical source means selectively connected to said motor drive means to energize same at a constant preselected speed.

5. The improved oscillograph of claim 3 wherein said paper roll holder assemblies further comprise a fixed flange secured in rotatable relation to said housing means, a pivotable flange secured in rotatable relation to the opposite side of the housing means and adapted to pivot along the axis of the paper roll, said flanges being adapted to receive and rotatably support therebetween the paper roll, said pivotable flange being spring-loaded to firmly confine said paper roll between the flanges, and said fixed flange includes a braking means integrally formed therewith to prevent random unrolling of the paper roll.

6. The improved oscillograph of claim 5 further including a low paper indicator means comprising, a filtered light source means for directing a color filtered light beam against the paper roll circumference immediately adjacent the fixed flange, an indicator hole formed within the fixed flange at a point radially spaced from the axis of the flange commensurate with the diameter of the paper roll at which time indication of diminishing paper is desired, and light sensing and indicating means disposed to receive light passing through the indicator hole to give indication at such time as the paper roll diminishes to the selected diameter.

7. The improved oscillograph of claim 6 wherein said indicator hole is graduated in size to provide an increase in the period of time that light is passing through the hole and thus a corresponding increase in the duration of said indication of diminishing paper.

8. The improved oscillograph of claim 4 wherein said motor drive means includes a low voltage hysteresis synchronous motor, and said electrical source means includes a low voltage direct current source and a synchronous reference signal source.

9. The improved oscillograph of claim 4 wherein said motor drive means includes a motor having a sprocket demountably secured to the shaft thereof, a second sprocket demountably secured to the drive roller and aligned with the motor sprocket, and endless belt means disposed about said sprockets to positively couple same rotatably together.

10. The improved oscillograph of claim 4 wherein said pair of spaced-apart pressure rollers further include a pair of resilient spring strips secured at each end thereof to respective ends of the pair of pressure rollers, and adjustable mounting means secured to the centers of the spring strips and to the housing means, whereby the spacing between said pressure rollers and the pressure thereof against the drive roller is varied by varying the adjustable mounting means.

References Cited

UNITED STATES PATENTS

| | | | |
|---|---|---|---|
| 2,718,450 | 9/1955 | Leonard et al. | 346—74 |
| 3,066,299 | 11/1962 | Kampf | 346—109 |
| 3,139,320 | 6/1964 | Johnson | 346—145 |
| 3,186,000 | 5/1965 | Sihvonen et al. | 346—109 |

RICHARD B. WILKINSON, *Primary Examiner.*

J. W. HARTARY *Assistant Examiner.*